United States Patent
Mei et al.

(10) Patent No.: US 12,448,016 B2
(45) Date of Patent: Oct. 21, 2025

(54) ENERGY-SAVING CONTROL METHOD FOR AUTOMATIC TRAIN OPERATION, AND RELATED DEVICE AND READABLE STORAGE MEDIUM

(71) Applicant: CRRC ZHUZHOU ELECTRIC LOCOMOTIVE RESEARCH INSTITUTE CO., LTD., Hunan (CN)

(72) Inventors: Wenqing Mei, Hunan (CN); Yuliang Wen, Hunan (CN); Cheng Li, Hunan (CN); Zhengfang Zhang, Hunan (CN); Puhua Zhong, Hunan (CN); Yuan Luo, Hunan (CN); Jie Jiang, Hunan (CN); Liang Hu, Hunan (CN); Yuehu Shao, HUnan (CN); Quanqiang Zhou, Hunan (CN)

(73) Assignee: CRRC ZHUZHOU ELECTRIC LOCOMOTIVE RESEARCH INSTITUTE CO., LTD., Hunan (CN)

( * ) Notice: Subject to any disclaimer, the term of this patent is extended or adjusted under 35 U.S.C. 154(b) by 234 days.

(21) Appl. No.: 17/924,148

(22) PCT Filed: Sep. 9, 2020

(86) PCT No.: PCT/CN2020/114146
§ 371 (c)(1),
(2) Date: Nov. 9, 2022

(87) PCT Pub. No.: WO2022/051922
PCT Pub. Date: Mar. 17, 2022

(65) Prior Publication Data
US 2023/0174125 A1   Jun. 8, 2023

(51) Int. Cl.
*B61L 27/16* (2022.01)
*G06Q 50/06* (2012.01)

(52) U.S. Cl.
CPC ............ *B61L 27/16* (2022.01); *G06Q 50/06* (2013.01)

(58) Field of Classification Search
CPC ...... B61L 15/0058; B61L 27/16; B61L 27/20; G06Q 10/04; G06Q 50/06; G06Q 50/40
See application file for complete search history.

(56) References Cited

U.S. PATENT DOCUMENTS

| | | | |
|---|---|---|---|
| 6,263,266 B1 * | 7/2001 | Hawthorne | G09B 9/048 701/19 |
| RE47,395 E * | 5/2019 | Oldknow | B61L 27/53 |

(Continued)

FOREIGN PATENT DOCUMENTS

| | | | | |
|---|---|---|---|---|
| CN | 108256255 A | * | 7/2018 | G06F 30/20 |
| CN | 109978350 A | | 7/2019 | |

(Continued)

OTHER PUBLICATIONS

240826 CN 111311017 machine translation (Year: 2020).*
Machine Translation Aug. 27, 2024 of Chinese Master Thesis by Jing Feiyao pp. 40_42 57_60 MT (002) (Year: 2019).*
CN-108256255-A 250325 Google Machine Translation (Year: 2018).*
International Search Report for PCT/CN2020/114146 mailed Jun. 10, 2021, ISA/CN.

(Continued)

*Primary Examiner* — Carl C Staubach
(74) *Attorney, Agent, or Firm* — Yue (Robert) Xu; Apex Attorneys at Law, LLP

(57) ABSTRACT

Provided are a control method, apparatus and device for an automatic train operation system. The method includes: acquiring multiple preset traction distribution strategies; determining, for each traction distribution strategy, a performance index of the traction distribution strategy; determining an optimal traction distribution strategy based on performance indexes of the multiple traction distribution strategies; and controlling the automatic train operation system based on the optimal traction distribution strategy.

10 Claims, 3 Drawing Sheets

(56) References Cited

U.S. PATENT DOCUMENTS

| | | | |
|---|---|---|---|
| 2004/0034556 A1* | 2/2004 | Matheson | B61L 27/14 705/7.24 |
| 2004/0133315 A1* | 7/2004 | Kumar | B61L 27/16 700/302 |
| 2010/0235022 A1* | 9/2010 | Siddappa | B61C 17/12 303/151 |
| 2012/0065818 A1 | 3/2012 | Haaf | |
| 2014/0036815 A1* | 2/2014 | Lei | H04B 7/0456 370/329 |
| 2014/0188375 A1* | 7/2014 | Kumar | G06F 17/00 701/117 |
| 2016/0075357 A1 | 3/2016 | Jung et al. | |
| 2017/0313330 A1* | 11/2017 | Frenzke | B61L 15/0018 |
| 2018/0201157 A1* | 7/2018 | Chen | B60L 15/2036 |
| 2021/0039500 A1* | 2/2021 | Li | B60L 7/12 |

FOREIGN PATENT DOCUMENTS

| | | |
|---|---|---|
| CN | 110533242 A | 12/2019 |
| CN | 111311017 A | 6/2020 |
| CN | 111409673 A | 7/2020 |

OTHER PUBLICATIONS

Jing. Feiyao, Study on Optimization of Longitudinal Dynamics of Coupler Force on Urban Rail Transit, Chinese Master's Theses Full-Text Database, Engineering Science & Technology II, Jul. 15, 2019 (Jul. 15, 2019), pp. 19-68.

Tian, Zhongbei, et al., SmartDrive: Traction Energy Optimization and Applications in Rail Systems, IEEE Transactions on Intelligent Transportation Systems, Jul. 31, 2019 (Jul. 31, 2019), vol. 20, No. 7.

\* cited by examiner

ENERGY-SAVING CONTROL METHOD FOR AUTOMATIC TRAIN OPERATION, AND RELATED DEVICE AND READABLE STORAGE MEDIUM

This application is the national phase of International Application No. PCT/CN2020/114146, titled "ENERGY-SAVING CONTROL METHOD FOR AUTOMATIC TRAIN OPERATION, AND RELATED DEVICE AND READABLE STORAGE MEDIUM", filed on Sep. 9, 2020, which is incorporated herein by reference in its entirety.

FIELD

The present disclosure relates to the technical field of automatic train operation, and more specifically, to an energy-saving control method for automatic train operation, a related device and a readable storage medium.

BACKGROUND

In recent years, with the rapid development of rail transit, an automatic train operation system (Automatic Train Operation, abbreviated as ATO) has also been widely applied, and has gradually become a necessary configuration for various trains (e.g., a subway train, a light rail train, a bullet train, a high-speed train, a heavy-haul train, etc.) in the field of urban rail transit and railway rail transit. Reducing energy consumption during train operation through the automatic train operation system is one of design goals of the automatic train operation system.

At present, generally a series of speed curve models are calculated first, then an energy consumption of each speed curve model is estimated, finally an optimal speed curve model is selected, and the optimal speed curve model is used as a target speed curve of the automatic train operation system, so as to reduce the energy consumption during the train operation. However, in this way, a train energy consumption model is generally considered when the optimal speed curve model is selected, and the train energy consumption model often deviates greatly from an actual energy consumption of the train, resulting in a deviation in the selection of the optimal speed curve model, which affects the energy-saving effect of the train. Moreover, the optimal speed curve model selected in this way is not applicable to a track section with strict requirements on the operation speed of the train, which also affects the energy-saving effect of the train.

Therefore, how to improve the energy-saving effect of the train has become a technical problem to be solved urgently by those skilled in the art.

SUMMARY

In view of the above problems, a control method for an automatic train operation system, a related device and a readable storage medium are provided according to the present disclosure. The specific solution is as follows.

A control method for an automatic train operation system includes:
acquiring multiple preset traction distribution strategies;
determining, for each traction distribution strategy, a performance index of the traction distribution strategy;
determining an optimal traction distribution strategy based on performance indexes of the plurality of traction distribution strategies; and
controlling the automatic train operation system based on the optimal traction distribution strategy.

In an embodiment, the calculating, for each traction distribution strategy, the performance index of the traction distribution strategy includes:
acquiring a speed curve and a total traction curve which are planned by the automatic train operation system, where the speed curve is configured to indicate a speed at each position within an interval planned by the automatic train operation system, and the total traction curve is configured to indicate a total traction of a train at each position within the interval planned by the automatic train operation system;
calculating a traction curve of each axle corresponding to the traction distribution strategy based on the total traction curve, where the traction curve of each axle corresponding to the traction distribution strategy is configured to indicate a traction of the axle at each position within the interval planned by the automatic train operation system under the traction distribution strategy; and
calculating the performance index of the traction distribution strategy based on the traction curve of each axle corresponding to the traction distribution strategy and the speed curve.

In an embodiment, the calculating the performance index of the traction distribution strategy based on the traction curve of each axle corresponding to the traction distribution strategy and the speed curve includes:
calculating a first performance index of the traction distribution strategy based on the traction curve of each axle corresponding to the traction distribution strategy and the speed curve, where the first performance index is configured to measure a traction energy consumption of the traction distribution strategy;
calculating a second performance index of the traction distribution strategy based on the traction curve of each axle corresponding to the traction distribution strategy, where the second performance index is configured to measure a balance degree of tractions of respective axles under the traction distribution strategy;
acquiring a weight coefficient of the first performance index and a weight coefficient of the second performance index; and
calculating the performance index of the traction distribution strategy based on the first performance index, the second performance index, the weight coefficient of the first performance index and the weight coefficient of the second performance index.

In an embodiment, the determining the optimal traction distribution strategy based on performance indexes of the multiple traction distribution strategies includes:
determining a traction distribution strategy with a minimum performance index as the optimal traction distribution strategy.

In an embodiment, the multiple preset traction distribution strategies include:
any combination of a first traction distribution strategy, a second traction distribution strategy, a third traction distribution strategy and a fourth traction distribution strategy;
the first traction distribution strategy is configured to instruct a balanced distribution of tractions of respective axles;

the second traction distribution strategy is configured to instruct to make as many axles as possible achieve an optimal efficiency, and instruct a balanced distribution among remaining axles;

the third traction distribution strategy is configured to instruct to make as many axles as possible in a state of no power consumption, and make the remaining axles achieve an optimal efficiency as much as possible; and the fourth traction distribution strategy is configured to instruct to make as many axles as possible in a state of no power consumption, and instruct a balanced distribution among the remaining axles.

In an embodiment, the controlling the automatic train operation system based on the optimal traction distribution strategy includes:

providing the traction curve of each axle corresponding to the optimal traction distribution strategy to the automatic train operation system, so that the automatic train operation system distributes motor power to all axles based on traction curves of all the axles corresponding to the optimal traction distribution strategy.

A control apparatus for an automatic train operation system includes:

an acquisition unit, configured to acquire multiple preset traction distribution strategies;

a calculation unit, configured to calculate, for each traction distribution strategy, a performance index of the traction distribution strategy;

a determination unit, configured to determine an optimal traction distribution strategy based on performance indexes of the multiple traction distribution strategies; and a control unit, configured to control the automatic train operation system based on the optimal traction distribution strategy.

In an embodiment, the calculation unit includes:

a speed curve and total traction curve acquisition unit, configured to acquire a speed curve and a total traction curve which are planned by the automatic train operation system, where the speed curve is configured to indicate a speed at each position within an interval planned by the automatic train operation system, and the total traction curve is configured to indicate a total traction of a train at each position within the interval planned by the automatic train operation system;

an axle traction curve calculation unit, configured to calculate a traction curve of each axle corresponding to the traction distribution strategy based on the total traction curve, where the traction curve of each axle corresponding to the traction distribution strategy is configured to indicate a traction of the axle at each position within the interval planned by the automatic train operation system under the traction distribution strategy; and a performance index calculation unit, configured to calculate the performance index of the traction distribution strategy based on the traction curve of each axle corresponding to the traction distribution strategy and the speed curve.

In an embodiment, the performance index calculation unit includes:

a first performance index calculation unit, configured to calculate a first performance index of the traction distribution strategy based on the traction curve of each axle corresponding to the traction distribution strategy and the speed curve, where the first performance index is configured to measure a traction energy consumption of the traction distribution strategy;

a second performance index calculation unit, configured to calculate a second performance index of the traction distribution strategy based on the traction curve of each axle corresponding to the traction distribution strategy, where the second performance index is configured to measure a balance degree of tractions of respective axles under the traction distribution strategy;

a weight coefficient acquisition unit, configured to acquire a weight coefficient of the first performance index and a weight coefficient of the second performance index; and a performance index calculation subunit, configured to calculate the performance index of the traction distribution strategy based on the first performance index, the second performance index, the weight coefficient of the first performance index and the weight coefficient of the second performance index.

In an embodiment, the determination unit is specifically configured to:

determine a traction distribution strategy with a minimum performance index as the optimal traction distribution strategy.

In an embodiment, the multiple preset traction distribution strategies include:

any combination of a first traction distribution strategy, a second traction distribution strategy, a third traction distribution strategy and a fourth traction distribution strategy;

where the first traction distribution strategy is configured to instruct a balanced distribution of tractions of respective axles;

the second traction distribution strategy is configured to instruct to make as many axles as possible achieve an optimal efficiency, and instruct a balanced distribution among the remaining axles;

the third traction distribution strategy is configured to instruct to make as many axles as possible in a state of no power consumption, and make the remaining axles achieve an optimal efficiency as much as possible; and the fourth traction distribution strategy is configured to instruct to make as many axles as possible in a state of no power consumption, and instruct a balanced distribution among the remaining axles.

In an embodiment, the control unit is specifically configured to:

provide the traction curve of each axle corresponding to the optimal traction distribution strategy to the automatic train operation system, so that the automatic train operation system distributes motor power to respective axles based on traction curves of the respective axles corresponding to the optimal traction distribution strategy.

A control device for an automatic train operation system includes a memory and a processor;

the memory is configured to store a program; and the processor is configured to execute the program to implement steps of the above control method for the automatic train operation system.

A readable storage medium stores a computer program, where the computer program when executed by a processor causes steps of the above control method for the automatic train operation system to be implemented.

Through the above technical solution, the energy-saving control method for the automatic train operation, the related device and the readable storage medium are provided according to the present disclosure. Based on the above solution, first the multiple preset traction distribution strategies are acquired, then for each traction distribution strategy, the performance index of the traction distribution strategy is acquired; the optimal traction distribution strategy is determined based on the performance indexes of the multiple traction distribution strategies; and finally, the automatic train operation system is controlled based on the optimal traction distribution strategy. In the above solution, multiple traction distribution strategies are provided, and the automatic train operation system is controlled based on the optimal traction distribution strategy, which ensures the optimal energy consumption of the traction motor, and thus improves the energy-saving effect of the train.

BRIEF DESCRIPTION OF THE DRAWINGS

By reading the detailed description of preferred embodiments below, various other advantages and benefits are clear to those skilled in the art. The drawings are only used for illustrating the preferred embodiments rather than limiting the present disclosure. Throughout the drawings, the same reference numerals are used to represent the same components. In the drawings.

DETAILED DESCRIPTION OF THE EMBODIMENTS

Technical solutions in the embodiments of the present disclosure are clearly and completely described below in conjunction with the drawings of the embodiments of the present disclosure. Apparently, the embodiments described in the following are only some embodiments of the present disclosure, rather than all of the embodiments. Any other embodiments obtained by those skilled in the art based on the embodiments in the present disclosure without any creative work fall within the protection scope of the present disclosure.

In order to improve the energy-saving effect of the train, the inventor of the present disclosure has conducted research and found that there are many on-board devices in the train. Among the on-board devices of the train, a traction motor is a source of the train power, and its energy consumption accounts for a large proportion of the total energy consumption of the train. Therefore, reducing the energy consumption of the traction motor plays a vital role in reducing the energy consumption of the train.

Based on the above ideas, the inventor of the present disclosure conducted in-depth research and finally proposed a control method for an automatic train operation system, which can improve the energy-saving effect of the train.

The control method for the automatic train operation system according to the present disclosure is described below through the following embodiments.

Figure 1:
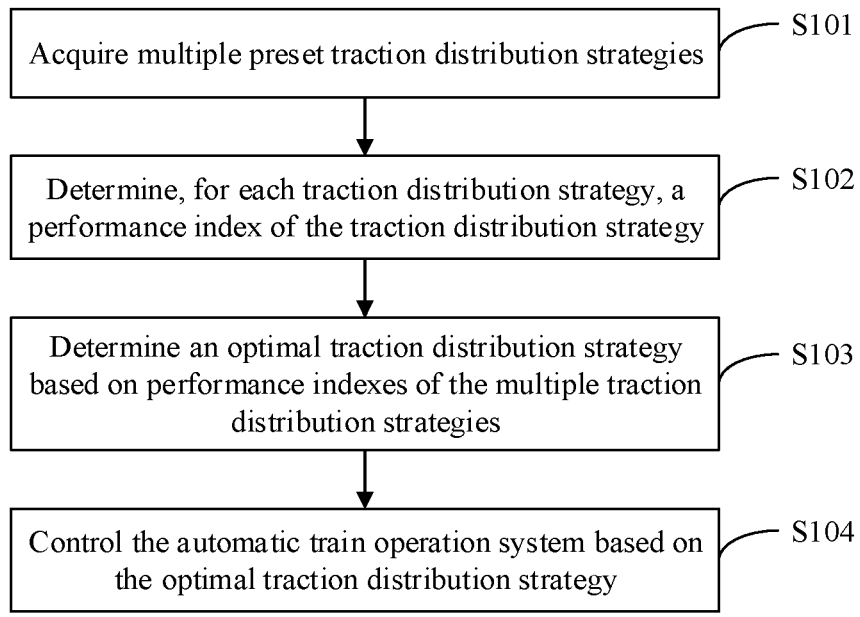
FIG. 1 is a flowchart showing a control method for an automatic train operation system according to an embodiment of the present disclosure.

Referring to FIG. 1, FIG. 1 is a flowchart showing a control method for an automatic train operation system according to an embodiment of the present disclosure, and the method includes the following steps S101 to S104.

In step S101, multiple preset traction distribution strategies are acquired.

In the present disclosure, the multiple preset traction distribution strategies include: any combination of a first traction distribution strategy, a second traction distribution strategy, a third traction distribution strategy and a fourth traction distribution strategy.

It should be noted that the first traction distribution strategy is configured to instruct a balanced distribution of tractions of respective axles; the second traction distribution strategy is configured to instruct to make as many axles as possible achieve an optimal efficiency, and instruct a balanced distribution among remaining axles; the third traction distribution strategy is configured to instruct to make as many axles as possible in a state of no power consumption, and make the remaining axles achieve an optimal efficiency as much as possible; and the fourth traction distribution strategy is configured to instruct to make as many axles as possible in a state of no power consumption, and instruct a balanced distribution among the remaining axles.

In step S102, it is determined, for each traction distribution strategy, a performance index of the traction distribution strategy.

In the present disclosure, the performance index of the traction distribution strategy is an index for measuring a traction energy consumption of the train and/or for measuring a balance degree of tractions of respective axles of the train.

It should be noted that, for each traction distribution strategy, the specific implementation for determining the performance index of the traction distribution strategy is described in detail through the following embodiments, which is not described here.

In step S103, an optimal traction distribution strategy is determined based on performance indexes of the multiple traction distribution strategies.

In the present disclosure, a traction distribution strategy with a minimum performance index may be determined as the optimal traction distribution strategy.

In step S104, the automatic train operation system is controlled based on the optimal traction distribution strategy.

In the present disclosure, the traction curve of each axle corresponding to the optimal traction distribution strategy is provided to the automatic train operation system, so that the automatic train operation system distributes motor power to respective axles based on traction curves of the respective axles corresponding to the optimal traction distribution strategy.

The energy-saving control method for the automatic train operation is provided according to the present disclosure. Based on the above method, first the multiple preset traction distribution strategies are acquired, then for each traction distribution strategy, the performance index of the traction distribution strategy is acquired; the optimal traction distribution strategy is determined based on the performance indexes of the multiple traction distribution strategies; and finally, the automatic train operation system is controlled based on the optimal traction distribution strategy. In the above solution, multiple traction distribution strategies are provided, and the automatic train operation system is controlled based on the optimal traction distribution strategy, which ensures the optimal energy consumption of the traction motor, and thus improves the energy-saving effect of the train.

Figure 2:
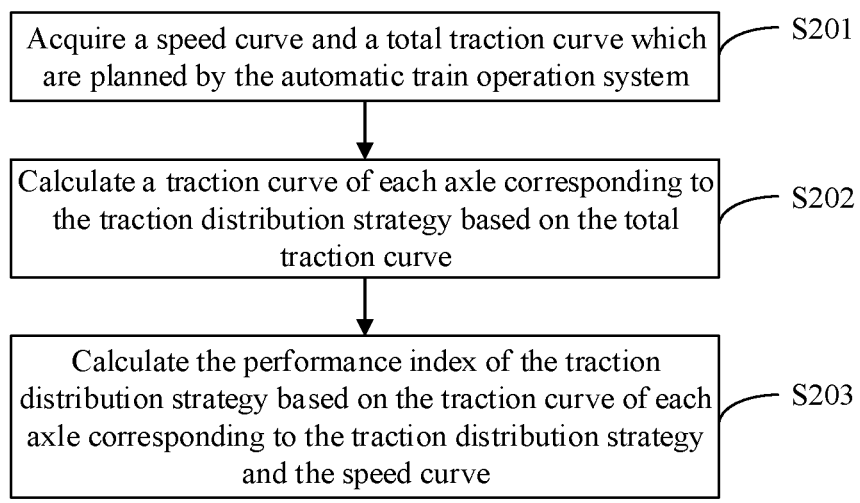
FIG. 2 is a flowchart showing a method for determining a performance index of a traction distribution strategy according to an embodiment of the present disclosure.

In another embodiment of the present disclosure, the specific implementation for determining, for each traction distribution strategy, the performance index of traction distribution strategy in the step S102 is described. Referring to FIG. 2, FIG. 2 is a flowchart showing a method for determining a performance index of a traction distribution strategy according to an embodiment of the present disclosure. As shown in FIG. 2, the method may include the following steps S201 to S203.

In step S201, a speed curve and a total traction curve which are planned by the automatic train operation system are acquired.

It should be noted that the speed curve is configured to indicate a speed at each position within an interval planned by the automatic train operation system, and the total traction curve is configured to indicate a total traction of a train at each position within the interval planned by the automatic train operation system.

For ease of understanding, assuming that a length of the interval planned by the automatic train operation system is $S_N$, then, the speed curve planned by the automatic train operation system is $v=v(s)$, where $0<s \leq S_N$, and the total traction curve planned by the automatic train operation system is $F=F(s)$, where $0<s \leq S_N$, and s represents any position within the interval planned by the automatic train operation system.

In step S202, a traction curve of each axle corresponding to the traction distribution strategy is calculated based on the total traction curve.

It should be noted that the traction curve of each axle corresponding to the traction distribution strategy is configured to indicate a traction of the axle at each position within the interval planned by the automatic train operation system under the traction distribution strategy.

For ease of understanding, a traction curve of each axle corresponding to a traction distribution strategy is:

$F_{ij}(s)$, $i=1,2,3,4, j=1,2 \ldots ,D$, where, $F_{ij}$ represents a set traction curve of the j-th axle under the i-th traction distribution strategy, and D represents the number of axles of a single locomotive.

In step S203, the performance index of the traction distribution strategy is calculated based on the traction curve of each axle corresponding to the traction distribution strategy and the speed curve.

It should be noted that the specific implementation of calculating the performance index of the traction distribution strategy based on the traction curve of each axle corresponding to the traction distribution strategy and the speed curve is described through the following embodiments, which is not described in this embodiment.

Figure 3:
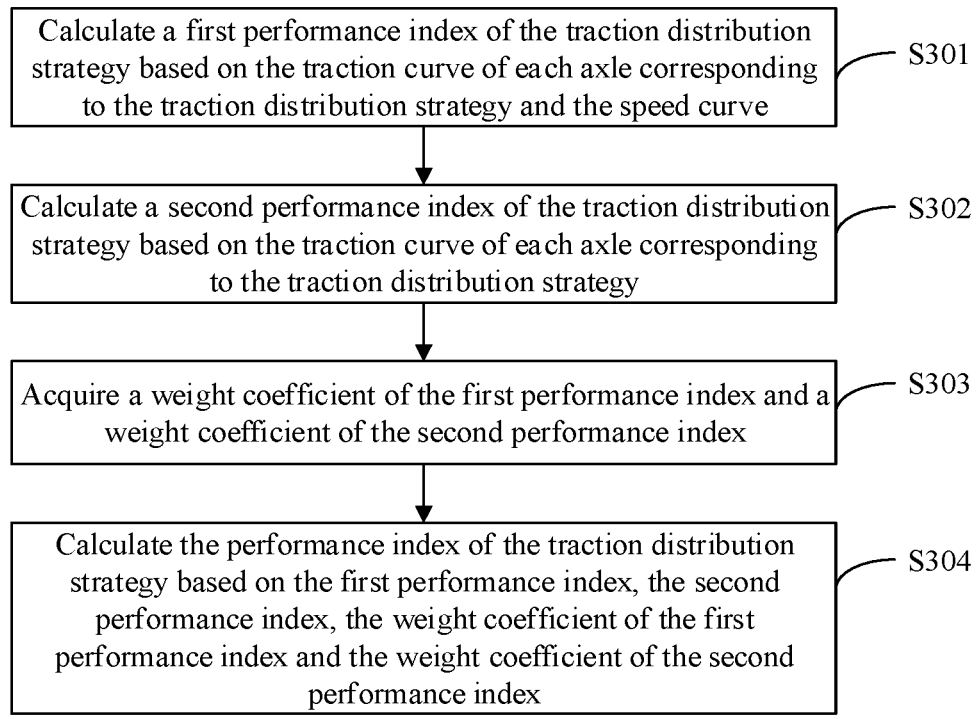
FIG. 3 is a flowchart showing a method for calculating a performance index of a traction distribution strategy according to an embodiment of the present disclosure.

In another embodiment of the present disclosure, the specific implementation of calculating the performance index of the traction distribution strategy based on the traction curve of each axle corresponding to the traction distribution strategy and the speed curve in the above step S203 is described. Referring to FIG. 3, FIG. 3 is a flowchart showing a method for calculating a performance index of a traction distribution strategy according to an embodiment of the present disclosure. As shown in FIG. 3, the method may include the following steps S301 to S304.

In step S301, a first performance index of the traction distribution strategy is calculated based on the traction curve of each axle corresponding to the traction distribution strategy and the speed curve.

It should be noted that the first performance index is configured to measure a traction energy consumption of the traction distribution strategy.

For ease of understanding, in the present disclosure, the first performance index may be calculated according to the following formula:

$$J_{i\eta} = \int_0^{S_N} \sum_{j=1}^{D} \frac{F_{ij}(s)}{\eta(F_{iuj}(s), v(s))} ds$$

where, $\eta(F_{ij}(s),v(s))$ is an efficiency fitting curve of a full traction range under a different speed condition.

In step S302, a second performance index of the traction distribution strategy is calculated based on the traction curve of each axle corresponding to the traction distribution strategy.

It should be noted that the second performance index is configured to measure a balance degree of tractions of respective axles under the traction distribution strategy.

For ease of understanding, in the present disclosure, the second performance index may be calculated according to the following formula:

$J_{iB}=\int_0^{S_N}\Sigma|F_{ij}(s)-F_{ik}(s)|ds$ where, j>k, and j, k=1, 2 . . . , D.

In step S303, a weight coefficient of the first performance index and a weight coefficient of the second performance index are acquired.

In the present disclosure, it may be assumed that the weight coefficient of the first performance index is $k_1$, and the weight coefficient of the second performance index is $k_2$.

In step S304, the performance index of the traction distribution strategy is calculated based on the first performance index, the second performance index, the weight coefficient of the first performance index and the weight coefficient of the second performance index.

Based on the above, the performance index of the traction distribution strategy may be specifically as follows:

$J=k_1 \cdot J_{i\eta}+k_2 \cdot J_{iB}$.

A control apparatus for an automatic train operation system according to an embodiment of the present disclosure is described below. The control apparatus for the automatic train operation system described below and the control method for the automatic train operation system may be referred to each other correspondingly.

Figure 4:
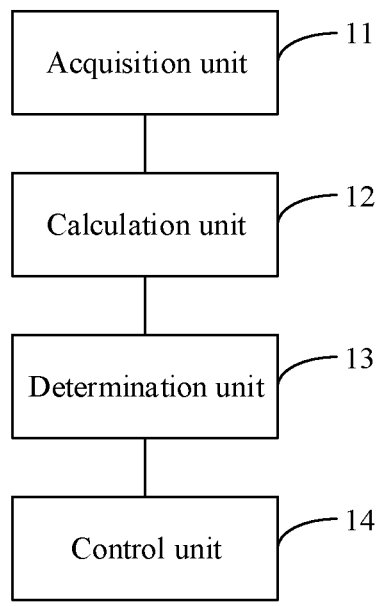
FIG. 4 is a schematic structural view of a control apparatus for an automatic train operation system according to an embodiment of the present disclosure.

Referring to FIG. 4, FIG. 4 is a schematic structural view of a control apparatus for an automatic train operation system according to an embodiment of the present disclosure. As shown in FIG. 4, the control apparatus for the automatic train operation system may include: an acquisition unit 11, a calculation unit 12, a determination unit 13 and a control unit 14.

The acquisition unit 11 is configured to acquire multiple preset traction distribution strategies.

The calculation unit 12 is configured to calculate, for each traction distribution strategy, a performance index of the traction distribution strategy.

The determination unit 13 is configured to determine an optimal traction distribution strategy based on performance indexes of the multiple traction distribution strategies.

The control unit 14 is configured to control the automatic train operation system based on the optimal traction distribution strategy.

In an embodiment, the calculation unit includes:
- a speed curve and total traction curve acquisition unit, configured to acquire a speed curve and a total traction curve which are planned by the automatic train operation system, where the speed curve is configured to indicate a speed at each position within an interval planned by the automatic train operation system, and the total traction curve is configured to indicate a total traction of a train at each position within the interval planned by the automatic train operation system;
- an axle traction curve calculation unit, configured to calculate a traction curve of each axle corresponding to the traction distribution strategy based on the total traction curve, where the traction curve of each axle corresponding to the traction distribution strategy is configured to indicate a traction of the axle at each position within the interval planned by the automatic train operation system under the traction distribution strategy; and
- a performance index calculation unit, configured to calculate the performance index of the traction distribution strategy based on the traction curve of each axle corresponding to the traction distribution strategy and the speed curve.

In an embodiment, the performance index calculation unit includes:
- a first performance index calculation unit, configured to calculate a first performance index of the traction distribution strategy based on the traction curve of each axle corresponding to the traction distribution strategy and the speed curve, where the first performance index is configured to measure a traction energy consumption of the traction distribution strategy;
- a second performance index calculation unit, configured to calculate a second performance index of the traction distribution strategy based on the traction curve of each axle corresponding to the traction distribution strategy, where the second performance index is configured to measure a balance degree of tractions of respective axles under the traction distribution strategy;
- a weight coefficient acquisition unit, configured to acquire a weight coefficient of the first performance index and a weight coefficient of the second performance index; and
- a performance index calculation subunit, configured to calculate the performance index of the traction distribution strategy based on the first performance index, the second performance index, the weight coefficient of the first performance index and the weight coefficient of the second performance index.

In an embodiment, the determination unit is specifically configured to:
- determine a traction distribution strategy with a minimum performance index as the optimal traction distribution strategy.

In an embodiment, the multiple preset traction distribution strategies include:
- any combination of a first traction distribution strategy, a second traction distribution strategy, a third traction distribution strategy and a fourth traction distribution strategy;
- where the first traction distribution strategy is configured to instruct a balanced distribution of tractions of respective axles;
- the second traction distribution strategy is configured to instruct to make as many axles as possible achieve an optimal efficiency, and instruct a balanced distribution among remaining axles;
- the third traction distribution strategy is configured to instruct to make as many axles as possible in a state of no power consumption, and make the remaining axles achieve an optimal efficiency as much as possible; and
- the fourth traction distribution strategy is configured to instruct to make as many axles as possible in a state of no power consumption, and instruct a balanced distribution among the remaining axles.

In an embodiment, the control unit is specifically configured to:
- provide the traction curve of each axle corresponding to the optimal traction distribution strategy to the automatic train operation system, so that the automatic train operation system distributes motor power to respective axles based on traction curves of the respective axles corresponding to the optimal traction distribution strategy.

Figure 5:
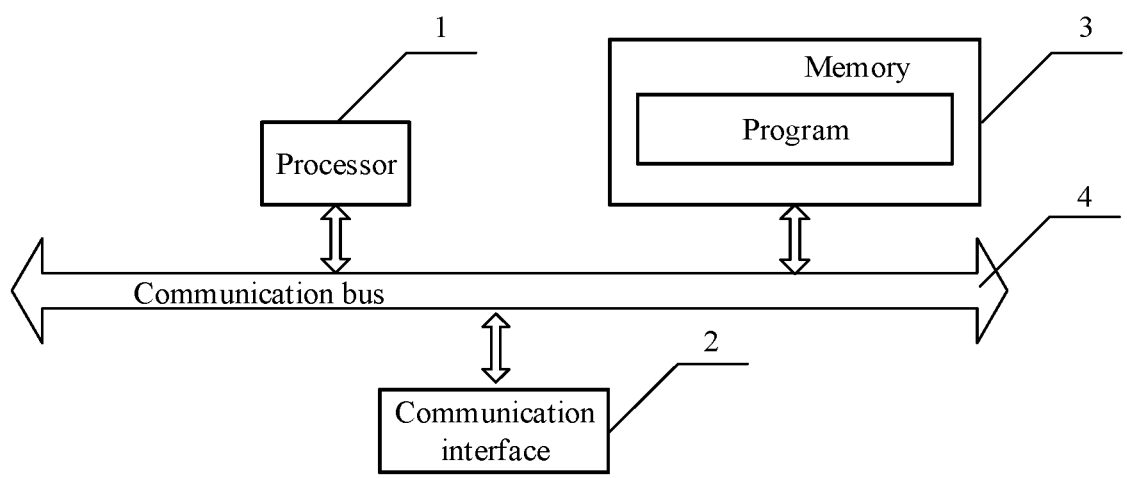
FIG. 5 is a block diagram showing a hardware structure of a control device for an automatic train operation system according to an embodiment of the present disclosure.

Referring to FIG. 5, FIG. 5 is a block diagram showing a hardware structure of a control device for an automatic train operation system according to an embodiment of the present disclosure. Referring to FIG. 5, the hardware structure of the control device for the automatic train operation system may include: at least one processor 1, at least one communication interface 2, at least one memory 3 and at least one communication bus 4.

In an embodiment of the present disclosure, the number of each of the processor 1, the communication interface 2, the memory 3, and the communication bus 4 is at least one, and the processor 1, the communication interface 2, and the memory 3 communicates with each other through the communication bus 4.

The processor 1 may be a central processing unit (CPU), or an application specific integrated circuit (Application Specific Integrated Circuit, abbreviated as ASIC), or one or more integrated circuits configured to implement embodiments of the present disclosure.

The memory 3 may include a high-speed RAM memory, or may include a non-volatile memory or the like, such as at least one disk memory.

The memory stores a program, and the processor may call the program stored in the memory. The program is configured to:
- acquire multiple preset traction distribution strategies;
- determine, for each traction distribution strategy, a performance index of the traction distribution strategy;
- determine an optimal traction distribution strategy based on performance indexes of the multiple traction distribution strategies; and
- control the automatic train operation system based on the optimal traction distribution strategy.

In an embodiment, the refinement function and the extended function of the program may refer to the above description.

A readable storage medium is further provided according to an embodiment of the present disclosure. The storage medium stores a program executable by a processor, and the program is configured to:
- acquire multiple preset traction distribution strategies;
- determine, for each traction distribution strategy, a performance index of the traction distribution strategy;
- determine an optimal traction distribution strategy based on performance indexes of the multiple traction distribution strategies; and control the automatic train operation system based on the optimal traction distribution strategy.

In an embodiment, the refinement function and the extended function of the program may refer to the above description.

Finally, it should be noted that the relationship terminologies such as "first", "second" and the like are only used herein to distinguish one entity or operation from another, rather than to necessitate or imply that the actual relationship or order exists between the entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

The above embodiments are described in a progressive manner. Each of the embodiments is mainly focused on describing its differences from other embodiments, and references may be made among these embodiments with respect to the same or similar parts.

With the above description of the disclosed embodiments, those skilled in the art can implement or use the present disclosure. Numerous modifications to the embodiments will be apparent to those skilled in the art, and the general principle herein can be implemented in other embodiments without deviation from the spirit or scope of the embodiments of the present invention. Therefore, the present disclosure is not limited to the embodiments illustrated herein, but should be defined by the widest scope consistent with the principle and novel features disclosed herein.

The invention claimed is:

1. A control method for an automatic train operation system, comprising:
  acquiring a plurality of preset traction distribution strategies;
  determining, for each traction distribution strategy, a performance index of the traction distribution strategy;
  determining an optimal traction distribution strategy based on performance indexes of the plurality of traction distribution strategies;
  controlling the automatic train operation system based on the optimal traction distribution strategy, wherein the determining the optimal traction distribution strategy based on the performance indexes of the plurality of traction distribution strategies comprises: determining a traction distribution strategy with a minimum performance index as the optimal traction distribution strategy, wherein the minimum performance index is for indicating a minimum traction energy consumption of a train and/or a minimum balance degree of tractions of respective axles of the train; and
  wherein the plurality of preset traction distribution strategies comprise:
  any combination of a first traction distribution strategy, a second traction distribution strategy, a third traction distribution strategy and a fourth traction distribution strategy;
  the first traction distribution strategy is configured to instruct a balanced distribution of tractions of respective axles;
  the second traction distribution strategy is configured to instruct to make as many axles as possible achieve an optimal efficiency, and instruct a balanced distribution among remaining axles;
  the third traction distribution strategy is configured to instruct to make as many axles as possible in a state of no power consumption, and make the remaining axles achieve an optimal efficiency as much as possible; and
  the fourth traction distribution strategy is configured to instruct to make as many axles as possible in a state of no power consumption, and instruct a balanced distribution among the remaining axles.

2. The method according to claim 1, wherein the calculating, for each traction distribution strategy, the performance index of the traction distribution strategy comprises:
  acquiring a speed curve and a total traction curve which are planned by the automatic train operation system, wherein the speed curve is configured to indicate a speed at each position within an interval planned by the automatic train operation system, and the total traction curve is configured to indicate a total traction of a train at each position within the interval planned by the automatic train operation system;
  calculating a traction curve of each axle corresponding to the traction distribution strategy based on the total traction curve, wherein the traction curve of each axle corresponding to the traction distribution strategy is configured to indicate a traction of the axle at each position within the interval planned by the automatic train operation system under the traction distribution strategy; and
  calculating the performance index of the traction distribution strategy based on the traction curve of each axle corresponding to the traction distribution strategy and the speed curve.

3. The method according to claim 2, wherein the calculating the performance index of the traction distribution strategy based on the traction curve of each axle corresponding to the traction distribution strategy and the speed curve comprises:
  calculating a first performance index of the traction distribution strategy based on the traction curve of each axle corresponding to the traction distribution strategy and the speed curve, wherein the first performance index is configured to measure a traction energy consumption of the traction distribution strategy;
  calculating a second performance index of the traction distribution strategy based on the traction curve of each axle corresponding to the traction distribution strategy, wherein the second performance index is configured to measure a balance degree of tractions of respective axles under the traction distribution strategy;
  acquiring a weight coefficient of the first performance index and a weight coefficient of the second performance index; and
  calculating the performance index of the traction distribution strategy based on the first performance index, the second performance index, the weight coefficient of the first performance index and the weight coefficient of the second performance index.

4. The method according to claim 1, wherein the controlling the automatic train operation system based on the optimal traction distribution strategy comprises:
  providing the traction curve of each axle corresponding to the optimal traction distribution strategy to the automatic train operation system, so that the automatic train operation system distributes motor power to respective axles based on traction curves of the respective axles corresponding to the optimal traction distribution strategy.

5. A control apparatus for an automatic train operation system, comprising:
a processor and a memory for storing a computer program, wherein the processor when executing the computer program, is configured to:
acquire a plurality of preset traction distribution strategies;
calculate, for each traction distribution strategy, a performance index of the traction distribution strategy;
determine an optimal traction distribution strategy based on performance indexes of the plurality of traction distribution strategies;
control the automatic train operation system based on the optimal traction distribution strategy, and determine a traction distribution strategy with a minimum performance index as the optimal traction distribution strategy, wherein the minimum performance index is for indicating a minimum traction energy consumption of a train and/or a minimum balance degree of tractions of respective axles of the train; and
wherein the plurality of preset traction distribution strategies comprise:
any combination of a first traction distribution strategy, a second traction distribution strategy, a third traction distribution strategy and a fourth traction distribution strategy;
wherein the first traction distribution strategy is configured to instruct a balanced distribution of tractions of respective axles;
the second traction distribution strategy is configured to instruct to make as many axles as possible achieve an optimal efficiency, and instruct a balanced distribution among remaining axles;
the third traction distribution strategy is configured to instruct to make as many axles as possible in a state of no power consumption, and make the remaining axles achieve an optimal efficiency as much as possible; and
the fourth traction distribution strategy is configured to instruct to make as many axles as possible in a state of no power consumption, and instruct a balanced distribution among the remaining axles.

6. The apparatus according to claim 5, wherein the processor when executing the computer program, is configured to:
acquire a speed curve and a total traction curve which are planned by the automatic train operation system, wherein the speed curve is configured to indicate a speed at each position within an interval planned by the automatic train operation system, and the total traction curve is configured to indicate a total traction of a train at each position within the interval planned by the automatic train operation system;
calculate a traction curve of each axle corresponding to the traction distribution strategy based on the total traction curve, wherein the traction curve of each axle corresponding to the traction distribution strategy is configured to indicate a traction of the axle at each position within the interval planned by the automatic train operation system under the traction distribution strategy; and
calculate the performance index of the traction distribution strategy based on the traction curve of each axle corresponding to the traction distribution strategy and the speed curve.

7. The apparatus according to claim 5, wherein the processor when executing the computer program, is configured to:
calculate a first performance index of the traction distribution strategy based on the traction curve of each axle corresponding to the traction distribution strategy and the speed curve, wherein the first performance index is configured to measure a traction energy consumption of the traction distribution strategy;
calculate a second performance index of the traction distribution strategy based on the traction curve of each axle corresponding to the traction distribution strategy, wherein the second performance index is configured to measure a balance degree of tractions of respective axles under the traction distribution strategy;
acquire a weight coefficient of the first performance index and a weight coefficient of the second performance index; and
calculate the performance index of the traction distribution strategy based on the first performance index, the second performance index, the weight coefficient of the first performance index and the weight coefficient of the second performance index.

8. The apparatus according to claim 5, wherein the processor when executing the computer program, is configured to:
provide the traction curve of each axle corresponding to the optimal traction distribution strategy to the automatic train operation system, so that the automatic train operation system distributes motor power to respective axles based on traction curves of the respective axles corresponding to the optimal traction distribution strategy.

9. A control device for an automatic train operation system, comprising a memory and a processor;
wherein the memory is configured to store a program; and
the processor is configured to execute the program to implement steps of the control method for the automatic train operation system according to claim 1.

10. A non-transitory computer-readable storage medium, storing a computer program, wherein the computer program when executed by a processor implements steps of the control method for the automatic train operation system according to claim 1.

* * * * *